United States Patent [19]
Moe, Jr. et al.

[11] 3,765,372
[45] Oct. 16, 1973

[54] PROCESS AND APPARATUS FOR MARICULTURE PRODUCTION

[75] Inventors: Martin A. Moe, Jr., Juno Isles; Jay P. Dunathan, Tequesta, both of Fla.

[73] Assignee: Oceanography Mariculture Industries, Inc.

[22] Filed: Nov. 29, 1971

[21] Appl. No.: 202,810

[52] U.S. Cl. .................................................. 119/3
[51] Int. Cl. .......................................... A01k 61/00
[58] Field of Search ..................................... 119/3, 5

[56] References Cited
UNITED STATES PATENTS

| | | | |
|---|---|---|---|
| 180,085 | 7/1876 | Wilmot | 119/3 |
| 2,944,513 | 7/1960 | Keely | 119/3 |
| 3,572,291 | 3/1971 | Cavanagh | 119/3 |

*Primary Examiner*—Hugh R. Chamblee
*Attorney*—Norman F. Oblon et al.

[57] ABSTRACT

A mariculture process for raising salt water fishes, such as pompano, whereby a brood stock is isolated in an artifically controlled environment, the temperature and degree of light exposure and intensity are adjusted so that sexual maturity of the brood stock is rapidly attained, spawning of the brood stock and egg fertilization is artificially induced by hormone extract, the fertilized eggs are removed from the brood stock and subjected to conditions suitable for hatching, and the larvae produced from the eggs are held in a controlled environment in order to develop them to a viable size. In a second embodiment, prior to the induced spawning procedure, the conditions of temperature and degree of light exposure and intensity are adjusted so that sexual development of the brood stock is suppressed until spawning is desired and thereafter the conditions of temperature and light exposure and intensity are readjusted so that sexual maturity of the brood stock is rapidly attained.

14 Claims, 3 Drawing Figures

PATENTED OCT 16 1973 3,765,372

INVENTOR
MARTIN A. MOE, JR.
J.P. DUNATHAN

BY Holon, Fisher, Spivak, & McClelland
ATTORNEY ary, and the invention is not intended to be the actual content:

PROCESS AND APPARATUS FOR MARICULTURE PRODUCTION

BACKGROUND OF THE INVENTION

1. Field of the Invention

This invention relates to a salt water "fish-farming" or mariculture process for the raising of fish as a food product, and to the individual subsystems useful in that process. More particularly, this invention relates to a unique fish-farming process whereby estuarine fishes can be economically produced on a large scale basis with minimal dependence on natural environmental conditions. This invention further relates to a unique pre-conditioning system for preparing fish for artificial or natural spawning and fertilization. In another aspect, this invention relates to a unique system of hatching fertilized fish eggs and for raising the larvae obtained from these eggs so as to optimize larval survival and development.

2. Description of the Prior Art

An ever-increasing demand for food fishes and for the protein derived therefrom has given rise to increased interest on the part of commercial concerns in the "farming" or raising of all types of fishes as a food source. However, although a significant amount of information has been published concerning fresh water "farming," there has been very little reported concerning the raising of estuarine or salt water type fishes. This is probably attributable to the significant difficulties in isolating and controlling the environmental conditions of the estuarine fish as compared with fresh water fish. Since fish living in natural ocean or sea waters are often subjected to radical and sometimes violent environmental changes, in order to provide a reliable and economical salt water fish farm, it is essential to remove the dependency of the mariculture fish population from such natural conditions and to provide an optimum artificially controlled environment which will permit the survival of a maximum quantity of the fish and will optimize the development of the fish in terms of food value and taste. Heretofore, however, no successful technique has been devised which will effectively remove the dependency of the fish population on all of the critical environmental conditions, and hence, heretofore, no economical mariculture has been devised which can be adapted for use on a large commercial scale.

A need exists, therefore, for a mariculture or salt water fish farming process whereby the fish are grown and spawned, the eggs hatched and the larvae raised to a viable size, in which a controlled environment is used to remove dependence on natural environmental conditions. This type of system has now been devised, which is believed to be suitable for the growing of a wide variety of estuarine fishes with only slight variations in environmental conditions depending upon the particular species. In discussing this invention, however, reference shall be made primarily to the species pompano, which is one of the most tasty of the salt water food fishes. It should be recognized, however, that pompano is referred to herein only as being illustrative, and the invention is not intended to be limited only to this particular species. In fact, this invention can be practiced with any of the large variety of the estuarine type fishes including: fresh and salt water catfish, mullet, sea trout, grunts, flounder, porgies, tilapia, fresh water trout, snapper, groupers, and tropical fresh and salt water aquarium fishes.

SUMMARY OF THE INVENTION

Accordingly, it is an object of this invention to provide a technique for raising estuarine fish in a controlled environment, whereby the growth and spawning cycle is removed from dependency on natural and environmental conditions.

It is another object of this invention to provide a technique for maintaining a stock of fish in a sexually suppressed condition until spawning is desired, and thereafter quickly maturing the stock to full sexual maturity and spawning capacity.

A further object of this invention is to provide a technique for incubating and hatching fertilized fish eggs and thereafter rearing the larvae to a viable size at optimum growth rates.

A still further object is to provide an apparatus for establishing a commercially feasible mariculture of estuarine type fish.

These and other objects have now been attained by the process, and by the use of an apparatus for carrying out the process, of isolating a brood stock of sexually immature fish from their natural environment by placing the stock into a water medium suitable for sustaining life in a healthy condition, whereby water quality, temperature, and degree of light exposure and light intensity can each be selectively controlled, adjusting the temperature and degree of light exposure and intensity so that sexual maturity of the brood stock is rapidly attained, inducing spawning of the brood stock and egg fertilization by treatment of the stock with a suitable hormone extract, removing the fertilized eggs from the brood stock and subjecting the eggs to conditions suitable for hatching, permitting the fertilized eggs to hatch and maintaining the larvae in a controlled environment media for a period sufficient to permit the larvae to develop to a viable size.

In another embodiment, prior to the induced spawning procedure, the conditions of temperature and degree of light exposure and intensity are adjusted so that sexual development of the brood stock will be suppressed until spawning is desired, and thereafter the conditions of temperature and degree of light exposure and intensity are re-adjusted so that sexual maturity of the brood stock will be rapidly attained.

In still another embodiment, a period of gradually increasing and decreasing light intensity precedes and succeeds each period of light exposure to avoid shock and panic to the brood stock.

In a further embodiment, estuarine type fish eggs are developed by the process of separating live fertilized eggs from the dead eggs, incubating the eggs until hatching is imminent, hatching the eggs in a carefully controlled larvae rearing tank, and maintaining the larvae in the tank until they obtain a viable size.

DETAILED DESCRIPTION OF THE INVENTION

Figure 1:
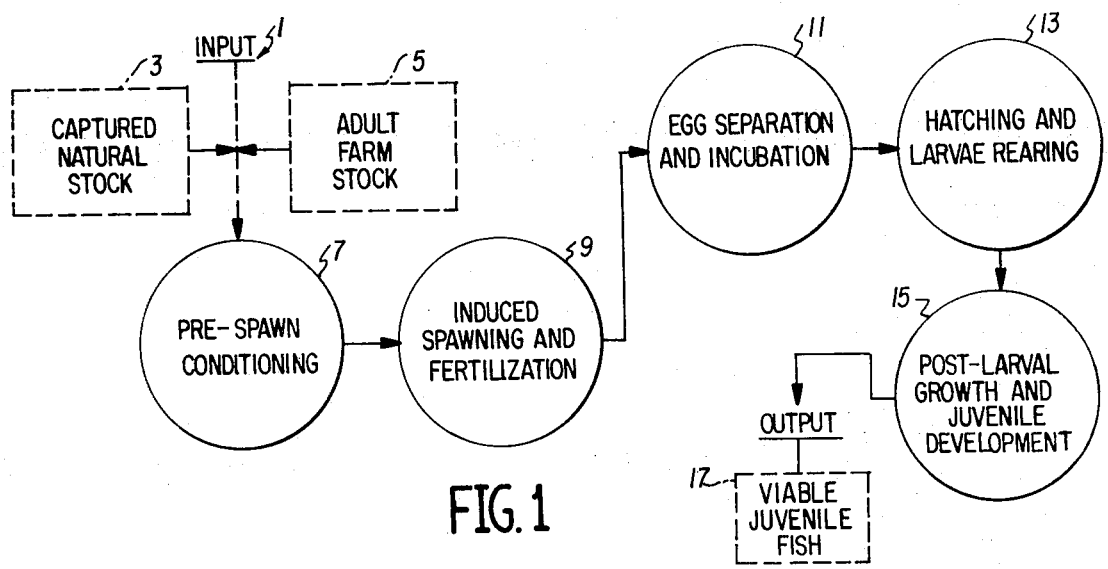
FIG. 1 is schematic view of the entire "fish-farming" or mariculture operation.

As can be seen from this schematic, an input brood stock 1 is isolated from either a natural stock 3 or by recycling a portion of the product from the later stages of the process 5, or partially from each source. The brood stock is maintained under conditions of light, temperature and fish density which are designed to suppress growth and sexual maturity, so that an input supply will be available as demanded by the process requirements. When spawning is desired, the inactive brood stock 1 is subjected to pre-spawn conditioning 7 in which the light, temperature and fish density are readjusted so that maximum growth and sexual development is obtained. The stock is then treated by conventional techniques to induce natural or forced spawning and fertilization 9. The live fertilized eggs are separated and are incubated 11, until just prior to hatching. The fertilized eggs are then transferred to a hatching and larvae rearing system 13 where they are permitted to hatch and the larvae are permitted to grow under carefully controlled environmental conditions to a suitable size which is sufficient to assure survival. The juvenile fish or "fingerlings" are then transferred to a final growth system 15 where they are raised to marketable size 17 and harvested.

MAINTENANCE STOCK BROOD

In the first stage of the process, a suitable brood stock of juvenile fish having immature or insufficiently developed sex organs is isolated, either from natural sources or from a portion of the product developed in the later stages of the process, or from a combination of both sources, for subsequent use as an input source for the mariculture.

The isolated stock is then placed into a controlled environment which is designed to suppress the normal maturation and development of the fish. The purpose of this technique is to provide an input brood stock supply which can be quickly brought to full spawning maturity as supply and process conditions require. This technique removes the spawning procedure from the unpredictableness of natural environmental conditions, so that spawning can be regulated and adapted for use in an economical fish farming operation.

If a suitable natural supply of juvenile fish is available, however, the isolation of the brood stock can be either entirely or partially eliminated and the natural stock can be used directly in the subsequent pre-spawning procedure. Where the natural supply is used to supplement the brood stock held under artificial environmental conditions, the natural source should be held in quarantine for a reasonable period of time to prevent possible contamination of the artificially maintained stock.

The quality and quantity of light, temperature and fish density used in the artificial environment, should be selected such that the sexual maturation of juvenile fish will be suppressed until spawning is desired. The particular light, temperature and fish density parameters which will yield the best results in terms of suppression of gonad development will depend upon the particular species of fish being raised. For instance, where species that spawn on decreasing photoperiods, such as mullet, channel bas, croaker and flounder are being bred, it is desirable to provide a very long period of light exposure, whereas when daylight type fish are being bred, such as pompano, it is desirable to considerably reduce the extent of light exposure.

It has been found that sexual maturation of pompano will be suppressed when light exposure is limited to a period of between 8 hours and 11 hours per 24 hour period, and most preferably between about 8½ to 10½ continuous hours per 24 hour period. This period is just less than the 11 hour water photoperiod of the South Florida area. The shorter photoperiod prevents liberation of gonadotropic hormones from the pituitary gland. The intensity of light should simulate natural conditions as closely as possible, and good results are attainable when the intensity is between 500 and 1,000 foot candles. This light intensity can be obtained by the use of a high intensity fluorescent lights coupled with incandescent bulbs. If desired, natural sunlight can be used as the light source by providing a suitable shield to limit the period of sunlight exposure. Regardless of the light source, however, it is essential that an interval of gradually increasing or decreasing light intensity precede each change from light period to dark period in order to simulate periods of natural dawn and dusk. It has been found that sudden changes in the light intensity can cause severe shock and panic in the fish population, which can not only cause severe immediate destruction, but can be responsible for inhibiting subsequent spawning. For the same reason, it is also desirable to provide a source of low intensity light, even during the dark period, in order to prevent disorientation of the fish, which could likewise cause severe immediate and/or long term damage.

The water temperature of the brood stock environment should be relatively low, depending upon the particular species. It has been found that the rate of growth and maturity of most species, including pompano, will be substantially lower in relatively colder waters than in warmer waters under otherwise similar environmental conditions. Consequently, the water temperature should be carefully adjusted to below the normal environmental temperature for the particular species. For instance, where the species being bred is pompano, it is desirable to maintain the water temperature at between 19°C. and 23°C.

All other environmental conditions in the controlled environment brood stock should be selected so as to simulate as closely as possible the natural environmental conditions of the species in order that the brood stock will remain in as healthy condition as possible, suitable for further processing.

It has been found that fish which are held under high density conditions will mature at a much slower rate because the accumulation of metabolites and other organic substances in the water inhibit growth and sexual development.

The brood stock may be maintained in a land-borne or seaborne tank, vessel, or container. However, since the purpose of isolating the brood stock is to decrease or eliminate the dependency of fish growth on natural environmental conditions, it is most desirable to provide a tank system which is completely removed from the natural habitat of the particular fish species. The size of the container or vessel is not particularly critical, except that a sufficient capacity must be provided to assure proper aeration, recirculation, filtering and fish density.

Large temperature fluctuations in the water medium will have a deleterious effect on the growth and spawning capacity of the fish, and accordingly, it is desirable that such fluctuations be carefully regulated so that the water temperature will not vary by more than 1° or 2° C. in any 24-hour period.

All other conditions in the artificial environment, other than light, temperature, and fish density, should be fairly constant and should correspond as closely as possible to the most favorable natural conditions for the particular species being raised. The salinity of the water, the rate of water recirculation, and the degree of filtration should be regulated as closely as possible to simulate natural environmental conditions. When pompano is being raised, the salinity of the water should be maintained between 15 and 35 parts per thousand, water recirculation should occur as often as 40 times per day, and the filtration system should be adequate to remove or convert ammonia nutrients and particulate waste occurring in the environmental waters, as well as similar impurities from the system.

If desired, a plurality of tanks or containers may be provided and the development of the brood stock may occur, either concurrently within each container, or alternatively, the degree of brood stock development may vary from container to container in order to provide a uniform input supply for breeding purposes.

Figure 2:
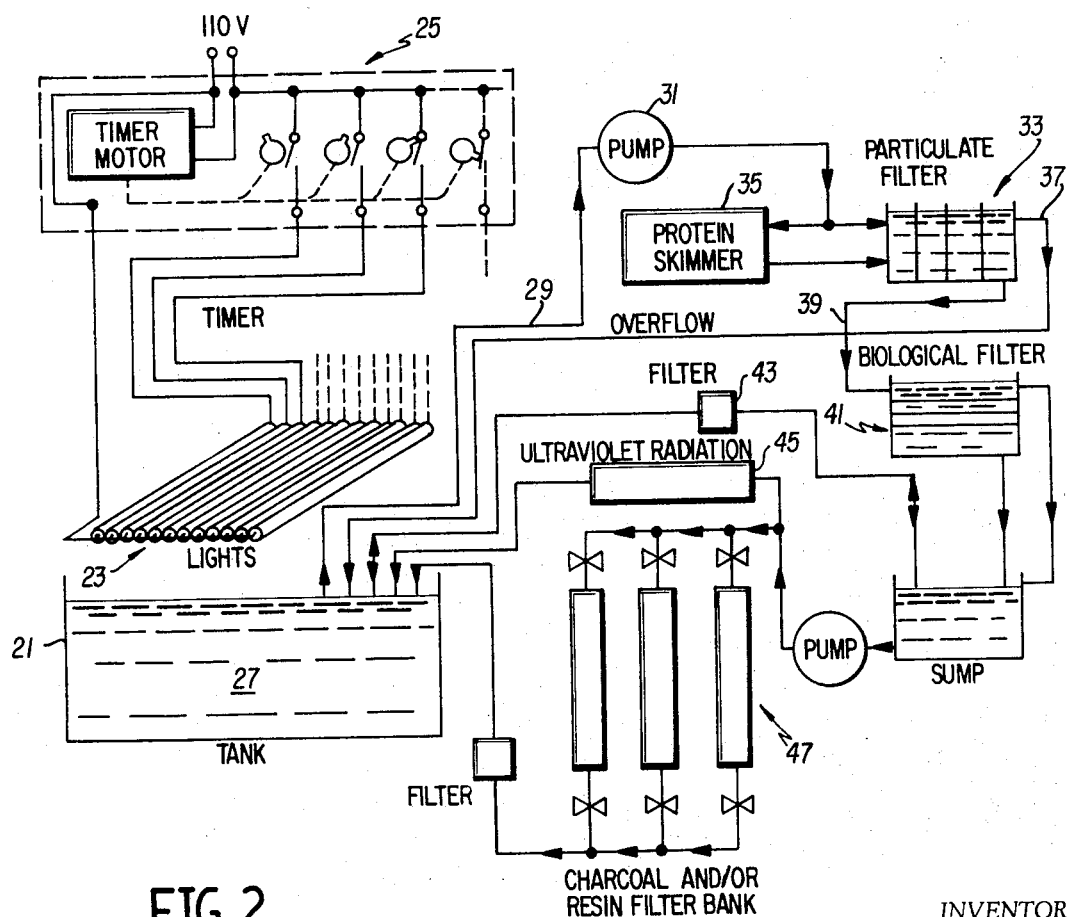
FIG. 2 is a schematic view of a suitable brood stock maintenance system.

One suitable brood stock maintenance system is shown in FIG. 2, wherein a tank 21 is shown with an artificial light source 23 and a control timer 25 for controlling the periods of relative lightness and darkness in the tank. Water 27 is pumped through a conduit 29 by means of pump 31 to a particulate filter 33 which acts to remove solid impurities, food fragments and the like. A portion of the impure water from conduit 29 is subjected to a conventional protein skimmer treatment 35 for the removal of high molecular weight organic substances prior to being subjected to the particulate filter 33. Particulate matter is permitted to settle to the bottom of the filter tank while the overflow is recirculated through conduit 37 back to holding tank 21. The bottoms from the particulate filter is then passed through conduit 39 into a biological filter 41, and then into filtered element 43, ultraviolet radiation treatment tank 45, and charcoal or resin filter bank 47. By the combined use of protein skimmer ultraviolet radiation, particulate, biological and resin or charcoal filters, the by-product toxins, fecal matter and decomposed food particles and the like can be removed from the system.

This system is further described in, and is the subject matter of copending application Ser. No. 66,826, filed Aug. 25, 1970.

When the species being raised is pompano, the tank waters may be exchanged up to 40 times per day and the period of light and darkness may be obtained at a ratio of about 7 : 9 to 15: 17 hours per 24 hour period. The periods of dawn and twilight should last about 20 minutes to 40 minutes, without increasing or decreasing light intensity of 100 to 10 foot candles during the dusk period and 10 to 100 foot candles during the dawn period.

PRE-SPAWN CONDITIONING

During pre-spawn conditioning period, the brood stock is subjected to conditions which will promote rapid sexual maturity and full development of the fish gonads, in order to prepare the fish for spawning. In order to provide this result, the stock is subjected to the opposite conditions of light, temperature and fish density as those which prevail during brood stock maintenance. In other words, where the fish species is a day-light type fish, the light duration is increased, the water temperature is increased, and the fish density is decreased.

Where the fish species is pompano, the duration of light treatment is increased to about 16 to 19 continuous hours per 24-hour period, using the same type of light source as that used during the brood stock maintenance stage. Periods of light and darkness should continue to be preceded by a gradually diminishing or increasing light intensity in order to simulate twilight and dawn conditions. A source of low intensity light should continue to be used during the dark periods in order to prevent fish disorientation.

It is essential during this period that the temperature be maintained at between 25° to 29°C. The normal temperature ranges during the spawning period in nature, or slightly above, will determine the range of temperatures selected for artificial farming and the fluctuations should be carefully controlled to within 1° to 3°C.

The fish population density is not actual and need only be below the maximum that the system will support to prevent stressing the fish. The remaining environmental requirements of water salinity, aeration, filtration, and recirculation should remain substantially the same as described for the brood stock maintenance. The particular pre-spawning environmental conditions, of course, will vary depending upon the particular species being raised. The length of time required for pre-spawning, will depend largely upon the natural sexual development rate of the particular species. Where pompano is being raised, full maturity of the fish gonads will ordinarily occur within 6 weeks from activation of pre-spawn conditioning, and the exact time required can be readily determined by periodic biopsy of samples from the fish culture.

The facilities required for pre-spawn conditioning may be substantially similar to those used in the brood stock maintenance period described in FIG. 2, although since the fish density must be reduced, the size and capacity of the holding tanks or containers may vary somewhat from those used during the brood stock maintenance period.

If desired, more than one tank or container may be provided so that the rate of maturation will occur either concurrently or sequentially in each tank, so as to provide an optimum source of input for the subsequent spawning procedure.

As indicated above, the brood stock input to the pre-spawn conditioning stage may consist of captured natural stock and/or juvenile products from the later stages of the mariculture.

INDUCED SPAWNING

Once sexual maturity of the brood stock has been attained, as evidenced by adequate gonad development of selected specimens, the pre-spawn conditioning period can be terminated. The individual fish in the stock are then subjected to conventional hormone treatments for the purpose of inducing spawning. As is well known, certain hormones will stimulate hormone secretions by the pituitary glands to force ovulation. Such hormone treatments conventionally consist of either one or two sequences of injections of a pituitary extract over a period of several days. If spawning and fertilization are to proceed by voluntary processes in the brood stock container, only pituitary extract of the particular species should be used.

In an alternative approach, ovulation can be forced by injecting human chorionic gonadotropin (HCG), together with a pituitary extract, into the fish and the sperm and eggs can be physically extracted from the fish. The eggs can then be fertilized by being mixed with the sperm and transferred to the hatching and incubation system.

Where pompano is the species being raised, two to three injections per day of from 0.5 to 1.0 cc.per kilogram weight of pituitary extract is usually sufficient to induce natural ovulation. and from 1 to 2 injections per day of from 250 to 55 international units per kilogram weight of HCG in combination with a pituitary extract is sufficient to force ovulation.

The required aeration, filtration, circulation and environmental control may be the same as those used during the pre-spawn conditioning, although a much wider variation in light control, environmental temperature and fish density can be tolerated.

In principle, all stages of the process may be carried out in sequence in the same container or in a series of containers, although it is preferable to use a separate container or containers for each stage. It is most preferable, however, especially when the number of conditioned fish is large, to remove the stock from the pre-spawn conditioning system in small groups and to facilitate observation and treatment as induced spawning proceeds.

EGG SEPARATION AND INCUBATION

Once the mature brood stock has spawned, the fertilized eggs are removed from the spawning system and the dead eggs and particulate debris are separated from the live fertilized eggs. The dead eggs can be separated from the live eggs by any one of a variety of conventional methods. However, where pompano eggs are being treated, it has been found that one particularly good technique is to separate the eggs using the natural buoyancy of the live fertilized eggs. It is known that the live fertilized eggs will float to the top of the container while the dead eggs will simultaneously settle to the bottom of the container. Once the dead eggs have settled, they can be simply removed by draining the lower, waste-laden water. A suitable device for accomplishing this type of separation is disclosed in, and is the subject matter of copending application Ser. No. 73,102, filed Sept. 17, 1970.

Incubation of the live eggs is then accomplished in a very carefully controlled environment in terms of light, temperature and salinity. In the case of pompano, for example, it is essential that the water temperature be maintained between 25°C. and 28°C. with temperature fluctuations of no more than 1°C. The salinity of the water should be maintained between 35 parts per thousand to 35 parts per thousand. Strong light during the entire incubation period must be avoided and the pH must be maintained between 8.1 and 8.3.

During the incubation process, it is desirable to expose the eggs to a relatively gentle stirring motion. This keeps the eggs from resting against each other during incubation, thus restricting bacteria contamination and keeping the eggs in contact with oxygenated water. The period of incubation, of course, will be determined by the particular species being developed. Pompano, for instance, usually require about 30 hours. The exact incubation time required can be readily determined by periodic examination of egg samples using a high powered microscope.

A wide variety of incubator designs can be used for achieving the environmental conditions required for the present process. One suitable system involves the use of an incubator container which is designed to float in a suitable incubator tank. The incubator tank is equipped with appropriate filtration, heating and recirculation systems to maintain the required environmental conditions. The walls of the incubator container are designed to permit the free flow of the water medium from the tank into the container so that the same environmental conditions will prevail in both the tank and in the container. A pump can be provided to cause a gentle stirring action in the tank and in the container. This type of incubator is disclosed and is the subject matter of copending application Ser. No. 73,103, filed Sept. 17, 1970.

It is preferable, although not essential, that a separate tank be used for separation and for incubation of the eggs, so that separation can proceed without affecting the incubator environment of an earlier breed through the introduction of dead eggs, debris, disturbances of the physical parameters or generation of turbulence of undesirable flow patterns.

Obviously, more than one separation and incubation system can be provided to allow for batch incuation on a staggered schedule to facilitate handling and observation in order to smooth the supply flow through the mariculture process.

HATCHING AND LARVAE REARING

This stage of the process is perhaps one of the most critical aspects of the present process, since the newly hatched larvae are quite vulnerable. This period of high vulnerability can last from several days to several weeks depending upon the particular species being bred. Pompano, for example, can remain vulnerable for up to two weeks after hatching.

In order to optimize the larval survival rate during this period, it is essential that the environmental parameters be very carefully controlled both during the actual hatching of the eggs and thereafter until the larvae are sufficiently developed to reasonably assure survival.

In order to provide this control, the eggs are transferred into specially provided hatching and larvae rearing tanks of either the water circulation or the static water type, when hatching appears to be imminent.

In either the water recirculation system or the static water system, it is essential to carefully maintain the temperature, salinity, degree of filtration, light duration, etc. The particular parameters, of course, will be controlled by the particular fish species being raised.

In the water circulation system, a relatively high rate of water exchange is provided to assure proper water quality. For example, in the case of pompano larvae, the tank should be exchanged up to 40 times per day. The degree of turbulence and the existence of significant pressure gradients in the water should be minimized and the flow of filtered water returning to the tank should be directed away from the tank walls so as to avoid possible injury to the larvae. Air bubbles due to supersaturation in a pump circulation system should be avoided, since such bubbles are apt to be fatal to the larvae if swallowed.

Figure 3:
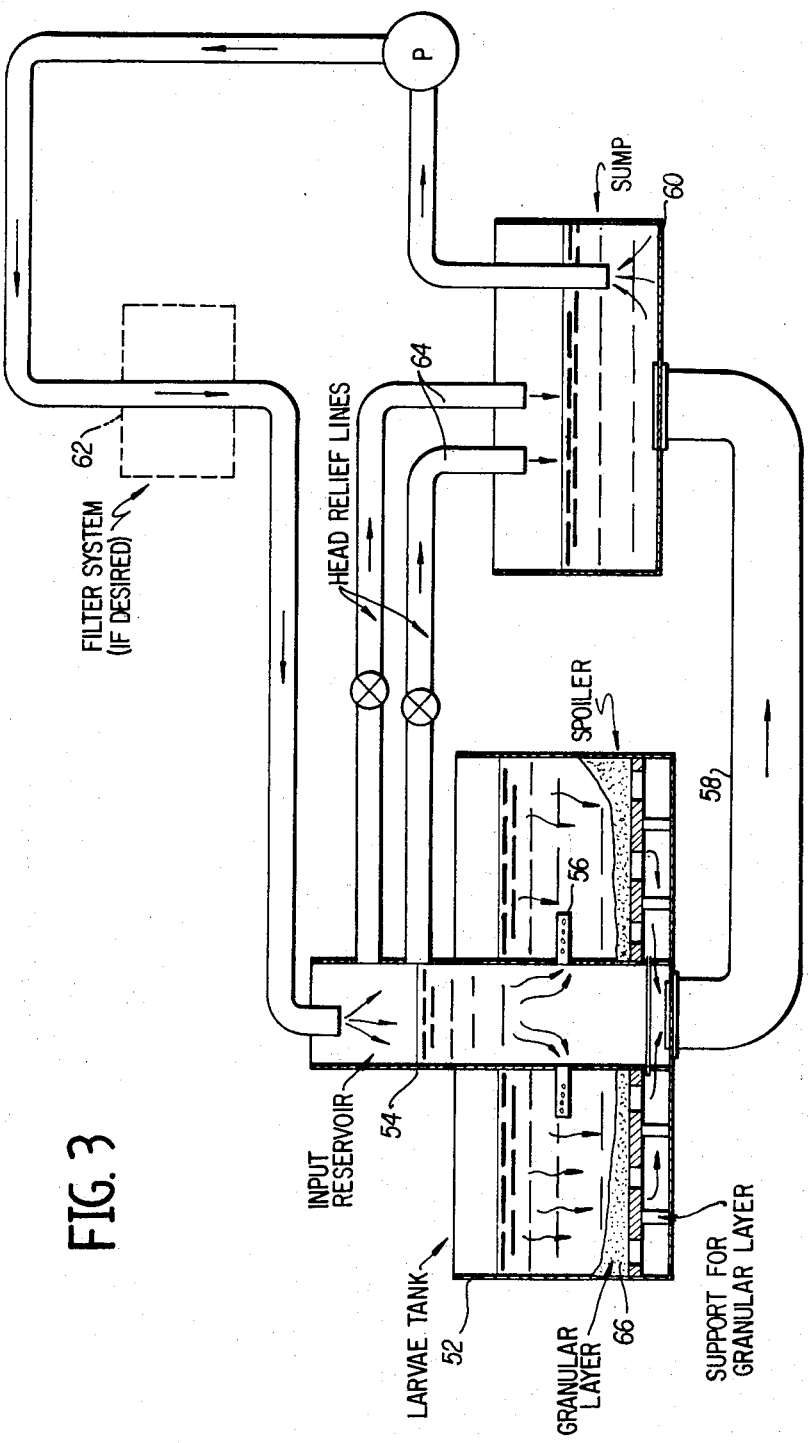
FIG. 3 is a schematic diagram of a larvae rearing tank and a water circulation and filtration system therefor, being shown partly in section.

One suitable recirculation system is shown in FIG. 3. A larvae tank 52 is provided containing an input reservoir 54 which holds the filtered water and delivers it through orifices 56 into the larvae tank. The input orifices 56 are in the form of horizontal hollow rods which are sealed on the end away from the reservoir. Water entering the larvae tank is therefore directed away from the container walls. A drainage conduit 58 carries the tank water through sump system 60 and optional filter system 62. The head relief lines 64 are also provided. A layer of granular material 66 is provided at the bottom of the larvae tank to allow full cross-sectional drainage of water from the tank so that high circulation rates can be maintained with a minimum of turbulence, suction or undesirable pressure gradients.

If a static system is used to raise the larvae, the problems of turbulence, supersaturation and current flow can be easily avoided; however, it is necessary to carefully monitor the water quality and other environmental parameters in order to maintain the purity of the media within strict limits depending upon the particular fish species being raised. Good water quality in the static system can be provided by the presence of a continual algae bloom in the tank throughout the larvae rearing stage. In a pompano mariculture, this is accomplished by adding a suitable volume of Chlorella culture to the tank after the eggs have been introduced. If necessary, water may be siphoned from the bottom of the tank and fresh sea water may be added, to maintain the Chlorella bloom.

Feeding is accomplished by the addition of plankton to the tank on a regular schedule; for instance, three times a day at 8 hour intervals. The plankton may be either captured or grown in the laboratory, but in any case, it may be desirable to separate the smaller sized portion of the population for use in the early stages of the larvae development. After absorption of the yolk sac, it is necessary to maintain a close surveillance over the feeding activity of the developing larvae so that this activity can be maintained at a high level. As the larvae continue to develop, the larger fraction of the plankton population can then be used as the feed source.

Instead of plankton, other types of food, including artificial compositions, may be used, which may be added directly to the tank water. For instance, suitable foods for pompano include oyster larvae, barnacle larvae, copepod nauplii, brine shrimp nauplii, and the like.

The population in the tank should be limited to larvae at about the same age in order to avoid disparities in size during the critical larvae recovery period, which disparities could complicate the feeding problems and the environmental control problems.

Where pompano larvae are being reared, the oxygen content of the water should be maintained at a level above 5 parts per thousand, salinity between 30 and 35 parts per thousand, temperature between 26°C. and 27°C., and pH of between 8.1 and 8.4. Lighting is constant.

The larvae will remain in the rearing system until they have achieved some degree of hardiness which will assure their survival. For pompano, this requires about 15 to 20 days, as evidenced by the growth of the fingerlings to about three-fourths inch.

POST LARVAL GROWTH AND JUVENILE DEVELOPMENT

After the early critical phase of larval growth, the fingerlings are transferred to a holding area in which they are permitted to develop to maturity, suitable for harvesting. A portion of the fingerlings at this stage can be recycled back to the brood stock maintenance tanks to reenter the processing cycle.

The environmental requirements in this stage are much less stringent than those required for the previous stages. If desired, for instance, the fingerlings can be contained in a wide variety of closed or open tanks or ponds containing either natural or artificial sea water. Where rapid development is desired, however, the fingerlings should be subjected to conditions similar to those described above for prespawn conditioning. Where economics require development to be delayed, the fingerlings should be subjected to conditions similar to those described above for brood stock maintenance.

It should be apparent that this stage of the process may be divided into additional subsystems if desired. For instance, separate tank systems can be used for the fingerlings up to a particular size, and separate tanks can be used for the juveniles. This might improve efficiency, since water quality, and consequently filtration capacity, is somewhat more critical in the earlier stages of development than in the later stages. Also, a change in the diet may be facilitated by a coincidental change of tanks, since, for example, different foods might impose different requirements on filter configurations in order to maintain the necessary water quality.

Having generally described the invention, a further understanding can now be obtained by reference to certain specific examples which are presented herein for purposes of illustration only and are not intended to be limiting in any manner.

EXAMPLE

A brood stock of approximately 200 pompano (*Trachinotus carolinus*) both male and female types, average age 2 years, were collected in a controlled environment land based tank having an inside capacity of 9,000 gallons. The fish density was 0.8 pounds of fish per cubic feet. This stock was captured from the wild population along the Florida East Coast. A light source, fluorescent and long-wave ultra violet having intensity of approximately 200 foot candles was provided to supply 8 hours of continuous daylight type light per 24 hour period. A low intensity light source (7½ watt incandescent bulb) having an intensity was used during the period of relative darkness. The water environment was controlled so as to have a salinity of 30–35 parts per thousand, temperature of about 20°C. and maximum temperature fluctuation of 2°C., pH 7.7 to 8.1 Water was recirculated through the filtering system at the rate of 5 times per 24-hour period. The stock was fed with 1½ pounds of prepared moist food at intervals of 3 times per 24 hour period. The brood stock was maintained in the system under these conditions for 90 days. Examination of the gonads of selected samples from the stock showed that the full sexual maturity had not yet occurred at the end of this period.

The brood stock was then transferred into a second tank system having an internal capacity of 2,000 gallons. The density in this second system was 0.1 pounds of fish per cubic foot. The same conditions of salinity, pH, recirculation and filtration as in the first tank were provided in the second tank as well. The period of light exposure using a similar light source to that as described above was increased to 15 continuous hours per 24 hour period, which was preceded and succeeded by 45 minutes of gradually increasing or decreasing light intensity. During the dark period, a low light intensity source of 3 watts was used to prevent disorientation of the fish population. The temperature of the tank was 28°C. with temperature fluctuations of ±1°C. The stock was fed with 8 ounces of shrimp or prepared food as described above.

Full sexual maturity as determined by the development of fully matured gonads was obtained after 10 weeks.

The brood stock was then transferred to a spawning tank; temperature 27°C±1°C., pH 7.9, salinity 35 percent. Each specimen of the stock was injected twice per day for 2 days with 0.5 cc of HCG and 0.5 cc. of pompano pituitary extract and their eggs and sperm were physically removed, mixed and placed in an egg separation tank. The live eggs were separated from the dead eggs using the natural buoyancy of the live fertilized eggs and draining the bottom portion of the tank containing the dead eggs. Incubation of the eggs occurred in a tank having a capacity of 120 gallons, recirculation rate of 1 change/15 minutes, water temperate 26°C., pH 8.1, salinity 35 percent, degree of aeration strong. After 1 day, hatching of the eggs appeared to imminent as determined by microscopic examination and eggs were transferred to a static type hatching and larvae rearing tank, temperature 26°C., ±0.5 pH, salinity 35 percent, aeration moderate. The eggs were permitted to hatch and the larvae was retained for 25 days. The larvae were fed cultured rotifers and copepods at abundance levels of 3 to 5 organisms per cc.

At the end of 3 weeks, the fingerlings were transferred to a tank similar to that described above for pre-spawning conditioning in order that they can be developed to the juvenile stage.

As will be apparent to one having ordinary skill in the art, the present fish-farming or mariculture process is composed of a number of unique subsystems which individually are believed to be novel and unobvious advances in the art. For instance, it is believed that the particular techniques of brood stock maintenance in which sexual maturity is suppressed, is a unique solution to a supply problem which has heretofore prevented or hindered large-scale fish-farming operations. The particular process for rapidly maturing the undeveloped fish is believed to be a unique method for reducing the amount of delay time previously necessary for bringing a juvenile fish up to full spawning capacity. The particular egg hatching and larvae rearing techniques are believed to be unique in their capabilities of providing an unusually high rate of larvae survival.

Although fish-farming techniques for fresh water fish seem to be well established, there is very little reported literature on techniques of fish-farming salt water or estuarine type fish, and it is believed that the present mariculture is the first totally controlled artificial environment culture of its type which can be used economically for large-scale fish-farming operations. The overall mariculture process, with or without the optional brood stock maintenance, is believed, therefore, to be a novel and unobvious advance in the art.

In addition, it is believed that certain combinations of the subsystems are unique in themselves, and can be used either in the present process or can be adapted for use in other types of fish-farming operations. For instance, it is believed that the unique control of light, temperature and fish density for first suppressing sexual development is a unique technique for supplying a constant and controlled quantity of fish for artificial and natural spawning. It is also believed that the technique for treating the eggs obtained from the spawning procedure and the manner of developing the eggs to obtain viable juvenile fish is another unique aspect of the invention.

It should be clearly understood that although considerable reference in the specification has been made to pompano, it will be apparent that many other varieties of maritime fish can be raised in the same manner simply by varying the specific environmental parameters. Accordingly, having now fully described the invention, many changes and modifications will be apparent to one of ordinary skill in the art without departing from the spirit or scope of the invention.

What is claimed and intended to be secured by Letters Patent of the United States is:

1. A mariculture process for raising estuarine fishes which comprises:
   isolating a brood stock of sexually inactive fish from the natural environment by placing the stock into a water media suitable for sustaining life in a healthy condition whereby water quality, temperature and degree of light exposure and light intensity can be each selectively controlled,
   adjusting the temperature and degree of light exposure and intensity so that sexual maturity of the brood stock is rapidly attained,
   inducing spawning of the brood stock and egg fertilization by treating the stock with a suitable hormone extract,
   removing the fertilized eggs from the brood stock and subjecting said eggs to conditions suitable for hatching,
   permitting the fertilized eggs to hatch and maintaining the larvae in a controlled environment media for a period sufficient to permit the larvae to develop to a viable size.

2. The process of claim 1, wherein prior to the induced spawning procedure, the conditions of temperature and degree of light exposure and intensity are adjusted so that sexual development of the brood stock is suppressed until spawning is desired and thereafter the conditions of temperature and degree of light exposure and intensity are readjusted so that sexual maturity of the brood stock is rapidly attained.

3. The process of claim 2, wherein the fish density of the brood stock is relatively higher during the period in which sexual maturity is being suppressed than during the period in which sexual maturity is being stimulated.

4. The process of claim 1, wherein the brood stock is isolated by being placed in a tank having a particulate and biological filtration system and a recirculation system suitable for maintaining the quality of the water sufficient for maintaining the brood stock in a healthy condition.

5. The process of claim 1, wherein fertilization is forced by extracting the eggs and sperm in a separate container, separating the live fertilized eggs from the dead eggs, and introducing the fertilized eggs to incubation conditions.

6. The process of claim 1, wherein when hatching of the eggs appears to be imminent, the eggs are transferred to a static water larvae rearing container in which water quality is maintained by the presence of a continual growth of algae in the water medium, and wherein the eggs are permitted to hatch and the larvae are permitted to develop to a viable size.

7. The process of claim 1, wherein when hatching of the eggs appears to be imminent, the eggs are transferred to a tank having a recirculating water system in which water quality is maintained by recirculating the water through a biological and particulate filter system, and wherein the water currents of filtered water reentering the tank are directed away from the tank walls to avoid injury to the larvae.

8. The process of claim 1 wherein after the larvae have been developed to a viable size, the conditions of temperature and degree of light exposure and light intensity are adjusted so as to rapidly provide a stock of marketable size.

9. The process of claim 1, wherein each period of light exposure is preceded and succeeded by a period of gradually increasing and decreasing light intensity, respectively, to avoid shock or panic to the brood stock.

10. The process of claim 1, wherein the fish being raised is pompano.

11. The process of claim 10, wherein prior to the induced spawning procedure, the conditions of temperature and degree of light exposure and intensity are adjusted so that sexual development of the brood stock is suppressed until spawning is desired and thereafter the conditions of temperature and degree of light exposure and intensity are readjusted so that sexual maturity in the brood stock is rapidly attained.

12. The process of claim 10, wherein after the eggs are fertilized, the live fertilized eggs are separated from the dead eggs by placing the eggs into a container having a water environment which closely simulates natural conditions of salinity, purity and temperature so that the natural buoyancy of the live eggs will cause the eggs to float to the top of said container, while the dead eggs will settle to the bottom of said container, and thereafter draining the lower portion of said container to remove the dead eggs.

13. The process of claim 10, wherein the live fertilized eggs are incubated at a water temperature of from 25° to 28°C. with temperature fluctuations of less than 1°C., salinity of from 34 parts per thousand to 35 parts per thousand, under continual lighting conditions at a pH of 8.1 to 8.3.

14. The process of claim 10, wherein the larvae rearing system is controlled so that the oxygen content of the water is above about 5 parts per million, salinity between 30 and 35 parts per thousand, water temperature of between 25°C and 28°C, a pH of between 8.1 and 8.3 and under continual lighting conditions.

* * * * *